United States Patent
Yoshikawa

(10) Patent No.: US 6,624,902 B2
(45) Date of Patent: *Sep. 23, 2003

(54) PRINTING APPARATUS AND METHOD FOR CONTROLLING PRINTING OPERATIONS ACCORDING TO TYPE OF RECORDING MEDIA

(75) Inventor: Naohiro Yoshikawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/172,262

(22) Filed: Oct. 14, 1998

(65) Prior Publication Data

US 2002/0063875 A1 May 30, 2002

(30) Foreign Application Priority Data

Oct. 20, 1997 (JP) ............................................. 9-286309

(51) Int. Cl.[7] .............................................. G06F 15/00
(52) U.S. Cl. ..................................... 358/1.12; 358/1.13
(58) Field of Search ........................ 358/1.1, 1.9, 1.12, 358/1.13, 1.14, 1.15; 347/18, 102, 171, 193; 400/166, 157.3, 167, 578, 708

(56) References Cited

U.S. PATENT DOCUMENTS

| 5,155,527 | A | | 10/1992 | Gokita et al. ................ 355/204 |
|---|---|---|---|---|
| 5,398,305 | A | * | 3/1995 | Yawata et al. ................ 358/1.1 |
| 5,584,590 | A | * | 12/1996 | Ito et al. ...................... 400/605 |
| 5,699,494 | A | * | 12/1997 | Colbert et al. ............. 358/1.15 |
| 5,755,521 | A | * | 5/1998 | Ito et al. ...................... 400/605 |
| 5,774,155 | A | * | 6/1998 | Medin et al. ................ 347/102 |
| 6,141,028 | A | * | 10/2000 | Aruga ......................... 347/193 |

FOREIGN PATENT DOCUMENTS

| JP | 3-271781 | 12/1991 |
|---|---|---|
| JP | 8-69458 | 3/1996 |
| JP | 9-30073 | 2/1997 |
| JP | 9-152750 | 6/1997 |
| JP | 9-255172 | 9/1997 |

* cited by examiner

*Primary Examiner*—Gabriel Garcia
(74) *Attorney, Agent, or Firm*—Fitzpatrick, Cella, Harper & Scinto

(57) ABSTRACT

In performing a printing operation, upon designating the type of paper by inputting it, a paper type table is searched to determine whether the designated type of paper requires a special printing operation, such as reverse feeding and printing. If the above-mentioned operation is required, an appropriate printing operation command is issued. If the above-mentioned operation is not necessary, a normal printing operation command is issued. A determination is also made of whether the designated type of paper requires a special fixing printing, such as cardboard mode fixing. If the above-mentioned operation is required, an appropriate fixing command is issued. If the above-mentioned operation is not necessary, a normal mode fixing command is issued. An image of print data is then formed and printed.

4 Claims, 10 Drawing Sheets

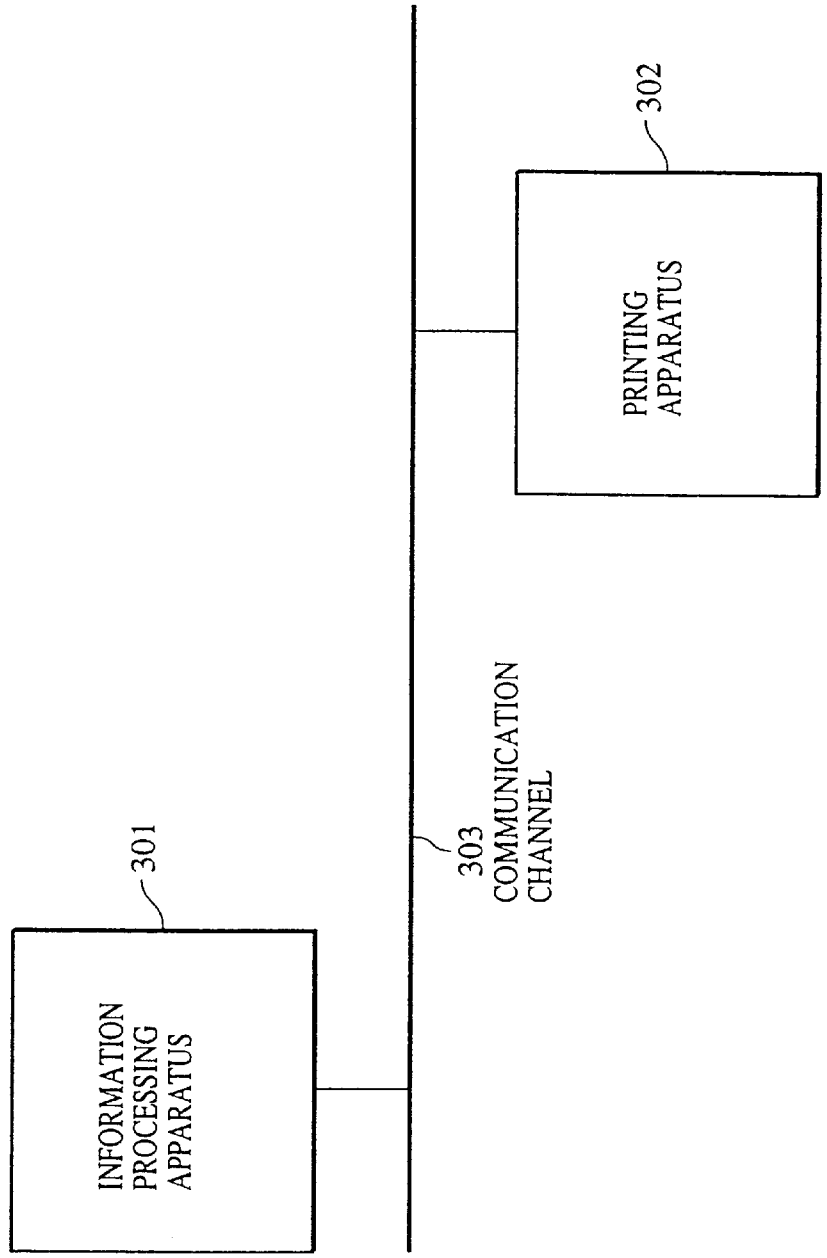

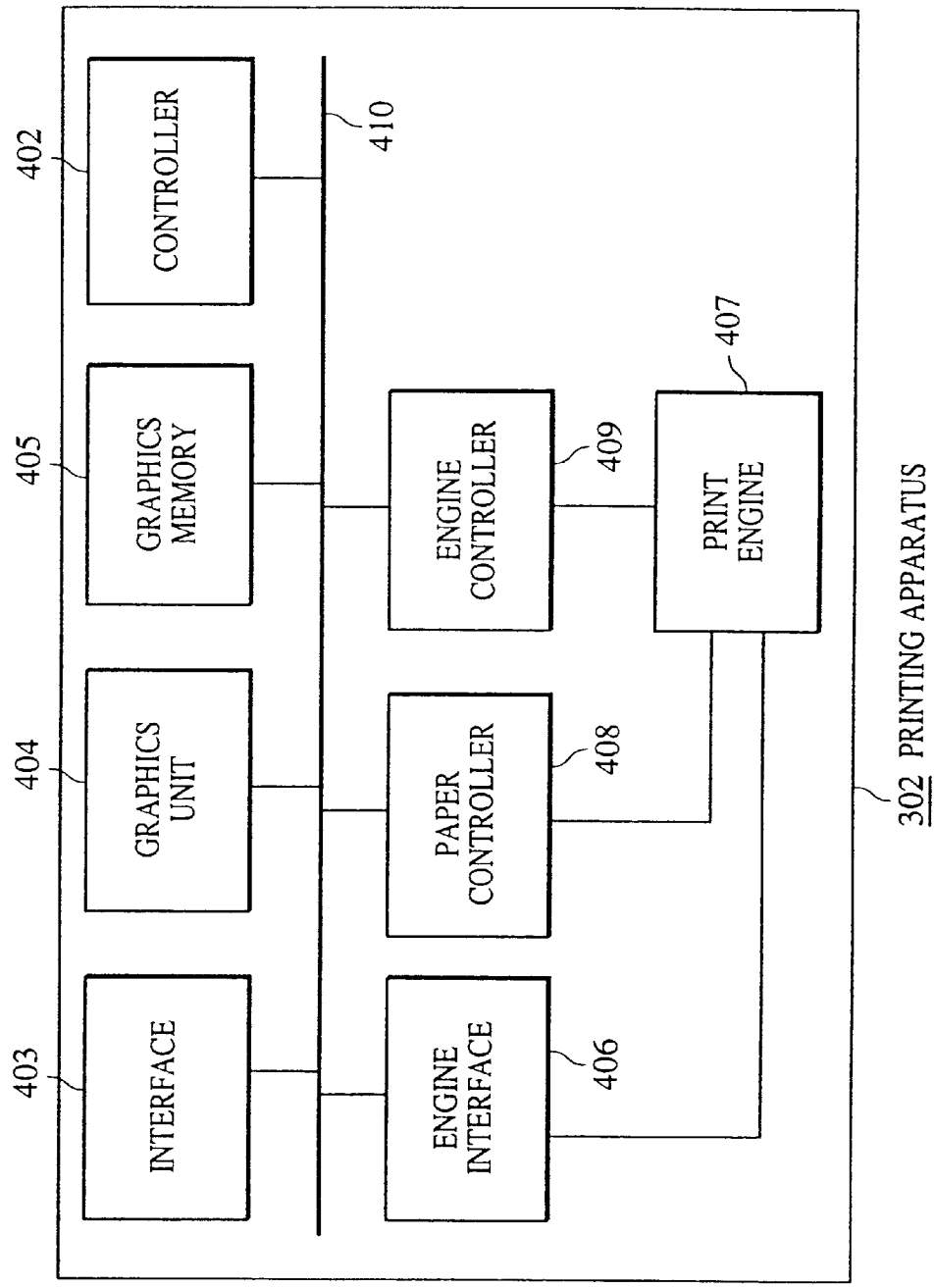

FIG. 6

| PAPER TYPE COLUMN 602 | FEEDING DIRECTION COLUMN 603 | FIXING MODE COLUMN 604 |
|---|---|---|
| A4 | NORMAL FEEDING | NORMAL MODE FIXING |
| B5 | NORMAL FEEDING | NORMAL MODE FIXING |
| POSTCARD | NORMAL FEEDING | CARDBOARD MODE FIXING |
| TRANSPARENCY | NORMAL FEEDING | CARDBOARD MODE FIXING |
| ENVELOPE KAKUGATA NO. 2 | REVERSE FEEDING | CARDBOARD MODE FIXING |
| ENVELOPE YOGATA NO. 4 | REVERSE FEEDING | CARDBOARD MODE FIXING |

601 PAPER TYPE TABLE 611, 612, 613, 614, 615, 616

PRINTING APPARATUS AND METHOD FOR CONTROLLING PRINTING OPERATIONS ACCORDING TO TYPE OF RECORDING MEDIA

BACKGROUND OF THE INVENTION

1. Field of the Invention

The present invention relates to a printing apparatus and a printing method in which a plurality of types of recording media are usable and to a storage medium in which a program code implementing the method is stored. The invention is also concerned with an information processing apparatus that transmits print data to effect a printing operation.

2. Description of the Related Art

A printing apparatus, such as a laser beam printer (hereinafter referred to as an "LBP"), forms a printing system when used in cooperation with an information processing apparatus, such as a computer. In the printing apparatus, when printing paper (hereinafter simply referred to as "paper") is the recording medium, it is normally fed with the upper portion of the paper first.

There are some printing apparatus of the above type in which not only standard paper, but also envelopes or postcards, are usable. To perform a printing operation on an envelope by using some such apparatus, it is necessary to feed the envelope in such a manner that the unsealed end leads the sealed end in the direction of feeding. FIG. 1A is a schematic side view of a known LBP illustrating the feeding direction of an envelope to be printed by using the LBP. FIG. 1A shows an LBP 101, a feeding tray 102 on which paper to be fed is placed, an envelope 103 placed on the feeding tray 102, and a discharging tray 105 to which printed paper is discharged. An arrow 104 indicates the direction in which the envelope 103 placed on the feeding tray 102 is fed to the LBP 101.

FIG. 1B illustrates the envelope 103 shown in FIG. 1A as viewed from the top. The envelope 103 has an unsealed end 106 and a sealed end 107.

However, the following problems are encountered when feeding the envelope 103 in such a manner that the unsealed end 106 is placed forward of the sealed end 107 in relation to a printing mechanism (hereinafter referred to as a "print engine") of a printing apparatus, such as an LBP. The incidence of paper jams, described below, is increased. The unsealed end 106 becomes stuck in one of the elements of the paper feeding mechanism, which hampers correct feeding of the envelope 103, thereby causing the envelope 103 to remain within the print engine. This inconveniences the user, wastes paper, and can lead to breakdown or early deterioration (shortening the life) of the print engine.

In order to solve the above problems, the following technique has been proposed. An envelope is fed in such a manner that the sealed end is located forward of the unsealed end, i.e., the envelope is turned 180 degrees from the known feeding direction, and a bit map image to be printed on the envelope is also turned 180 degrees. Printing processing accompanied by the above-mentioned paper feeding and image turning processing is hereinafter referred to as "reverse feeding and printing processing". With reverse feeding and printing processing, the incidence of jams is reduced because the unsealed end of the envelope, which is more likely to be stuck in an element of the paper feeding mechanism, is oriented backward in the direction of feeding, and the sealed end, which is less likely to be stuck in an element of the paper feeding mechanism, is placed forward in the direction of feeding.

FIG. 2A illustrates the relationship between the orientation of an envelope and a bit map image according to a technique prior to the advent of the reverse feeding and printing processing technique. The bit map image shown in FIG. 2A has been created for the case in which printing is performed by a printing apparatus (LBP) which feeds the envelope to the print engine from the unsealed end. FIG. 2A shows an envelope 202, a bit map image 201 to be printed on the envelope 202, a feeding direction 207 of the envelope 202 to the printing apparatus, a leading position 203 of the bit map image 201, and a trailing position 204 of the bit map image 201. The bit map image 201 is developed and stored in a memory (not shown) within the printing apparatus. A position 205 on the envelope 202 corresponds to the leading position 203 of the bit map image 201, and a position 206 corresponds to the trailing position 204 of the bit map image 201. The printing apparatus prints a visual image, corresponding to the bit map image 201 in the memory, in such a manner that the positions 203 and 204 of the bit map image 201 match the positions 205 and 206 of the envelope 202, respectively.

FIG. 2B illustrates the relationship between the orientation of an envelope and a bit map image according to the reverse feeding and printing processing technique. The bit map image has been created for the case in which printing is performed by a printing apparatus (LBP) which feeds the envelope to the print engine from the sealed end. FIG. 2B shows an envelope 212, a bit map image 211 to be printed on the envelope 212, a feeding direction 217 of the envelope 212 to the printing apparatus, a leading position 213 of the bit map image 211, and a trailing position 214 of the bit map image 211. The bit map image 211 is exactly the same as the image obtained by turning the counterpart 201 shown in FIG. 2A 180 degrees. A position 215 on the envelope 212 corresponds to the leading position 213 of the bit map image 211, and a position 216 corresponds to the trailing position 214 of the bit map image 211. The printing apparatus prints a visual image, corresponding to the bit map image 211 in the memory, in such a manner that the positions 213 and 214 of the bit map image 211 match the positions 215 and 216 of the envelope 212, respectively. In this manner, the reverse feeding and printing processing is implemented.

Known LBPs have a function by which a user can specify the paper type for use in printing, such as "A4", "B5", and "Envelope Kakugata No. 2" (Japanese standard), and can perform a printing operation in accordance with the specified type of paper. By using this function, the information concerning the designated paper type is converted into paper size information that is stored, together with paper type information, in a printing apparatus or an information processing apparatus. The paper size information is then used for printing processing.

Generally, the printing process used in the LBP is as follows. An electrostatic latent image is formed with a laser beam on a drum coated with a photosensitive material, and a coloring powder (toner), which is charged with a polarity opposite to the latent image, is attached to the drum. The latent image is transferred to a paper. A roller is then pressed against the paper to fix the image on the paper by heat and pressure. However, specific types of paper, such as that used in "Envelope Kakugata No. 2", are thicker than standard printing paper, and envelopes are also double-structured to form a bag-like shape. Accordingly, the energy (or paper feeding rate) which would normally be sufficient to raise the temperature to fix the toner on standard paper does not increase the temperature sufficiently to fix the toner on such an envelope. In a conventional printing system, when using the above type of envelope, the user specifies that cardboard paper is being used in order to increase the heating amount to a level sufficient to fix toner on cardboard (hereinafter referred to as "cardboard mode fixing").

The above type of printing system, however, requires a complicated operation, since the user is required to independently utilize a function of designating the type of paper and a function of performing a specific printing process, such as reverse feeding and printing processing and/or the cardboard mode fixing. More specifically, the user first specifies the type of paper, for example, "Envelope Kakugata No. 2", then designates reverse feeding and printing processing, which requires the setting of the envelope in the direction opposite to that shown in FIGS. 1A and 1B on the feeding tray of the printing apparatus, and finally specifies cardboard mode fixing. If the above operations are erroneously performed or the orientation of paper is incorrectly set, printing cannot be performed correctly because the feeding direction has been wrongly set or an image has been insufficiently fixed, thereby wasting time and paper, or causing a breakdown or early deterioration (shortening the life) of the print engine due to paper jams.

SUMMARY OF THE INVENTION

Accordingly, it is an object of the present invention to provide a printing apparatus and an information processing apparatus for use in a printing system, in which a specific printing operation, such as reverse feeding and printing or cardboard mode fixing, required in accordance with the type of recording medium is simplified and is automatically performed without causing any trouble.

To achieve the above object, according to one aspect, the present invention provides a printing apparatus with which a plurality of types of recording media are usable. The printing apparatus includes a printing mechanism for selectively performing any of a plurality of printing operations, and input means for receiving a signal indicative of which of the plural types of recording media is to be used. The printing apparatus further includes determining means for determining whether the indicated recording medium requires a specific one of the plural printing operations. Control means controls the printing mechanism to cause it to perform the specific printing operation when the determining means determines that the indicated recording medium requires the specific printing operation.

According to another aspect, the present invention provides an information processing apparatus that transmits print data to a printing apparatus, with which a plurality of types of recording media are usable and which selectively performs any of a plurality of printing operations, to cause the printing apparatus to perform one of the plural printing operations. The information processing apparatus includes input means for receiving a signal indicative of which of the plural types of recording media is to be used, and determining means for determining whether the indicated recording medium requires a specific one of the plural printing operations. Control means controls the printing apparatus to cause it to perform the specific printing operation when the determining means determines that the indicated recording medium requires the specific printing operation.

In the aforementioned printing apparatus or the information processing apparatus, the determining means and the control means (preferably, the controller of an apparatus formed of, for example, a microprocessor system) makes the above determination and performs the above control in accordance with a program stored in a memory of the controller. The aforementioned determination can be made in the following manner. A data table representing the relationship between the types of recording media and specific printing operations (for example, the above reverse feeding and printing operation and cardboard mode fixing) is stored in a memory. Upon designation of the type of recording medium, the table is searched to obtain data concerning the specific printing operation in accordance with the designated type of recording medium.

The aforementioned printing apparatus or the information processing apparatus may further include display means. The control means may cause the display means to display information concerning the specific printing operation before the printing mechanism or apparatus performs the specific printing operation.

The displayed information concerning the specific printing operation may specifically include information that the specific printing operation is to be performed or information concerning the orientation of a recording medium required for the specific printing operation.

According to still another aspect, the present invention provides a printing method for use in a printing apparatus with which a plurality of types of recording media are usable and which includes a printing mechanism for selectively performing any of a plurality of printing operations. The method includes the steps of receiving an indication of which of the plural types of recording media is to be used, determining whether the indicated recording medium requires a specific one of the plural printing operations, and controlling the printing mechanism of the printing apparatus to cause it to perform the specific printing operation when it is determined in the determining step that the indicated recording medium requires the specific printing operation.

According to a further aspect, the present invention provides a storage medium that stores a program code implementing a method for transmitting print data to a printing apparatus, with which a plurality of types of recording media are usable and which includes a printing mechanism for selectively performing any of a plurality of printing operations, to cause the printing apparatus to perform one of the plural printing operations. The method includes the steps of receiving an indication of which of the plural types of recording media is to be used, determining whether the indicated recording medium requires a specific one of the plural printing operations, and controlling the printing apparatus to cause it to perform the specific printing operation when it is determined in the determining step that the indicated recording medium requires the specific printing operation.

Further objects, features and advantages of the present invention will become apparent from the following description of the preferred embodiments with reference to the attached drawings.

The individual components designated by the blocks in the drawings are well known in the printing and information processing arts, and their specific construction and operation are not critical to the operation of or best mode for carrying out the invention.

BRIEF DESCRIPTION OF THE DRAWINGS

FIG. 3 is a block diagram illustrating the configuration of a printing system formed of a printing apparatus and an information processing apparatus according to the present invention;

FIG. 4 is a block diagram illustrating the configuration of the printing apparatus shown in FIG. 3;

FIG. 6 illustrates the logical structure of a paper type table used in the process steps shown in FIG. 5 for determining whether a certain type of paper requires a specific printing operation;

DESCRIPTION OF THE PREFERRED EMBODIMENTS

Figure 1A:
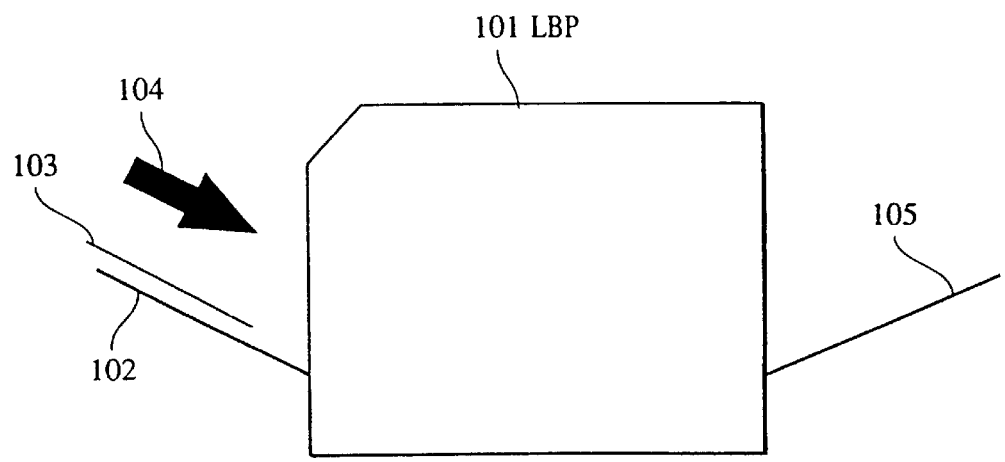
FIGS. 1A and 1B illustrate the feeding direction of an envelope for use in a known printing apparatus.
Figure 1B:
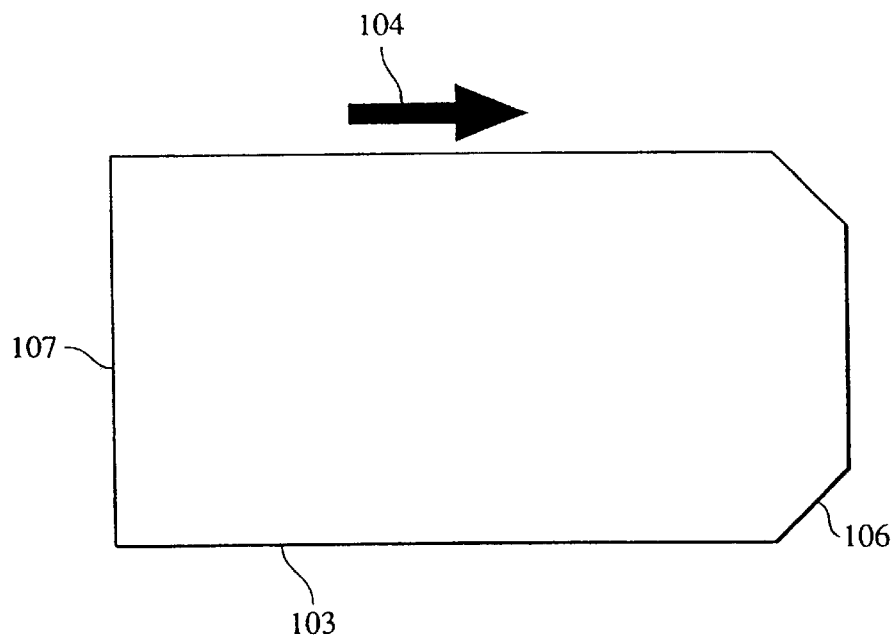
Figure 2A:
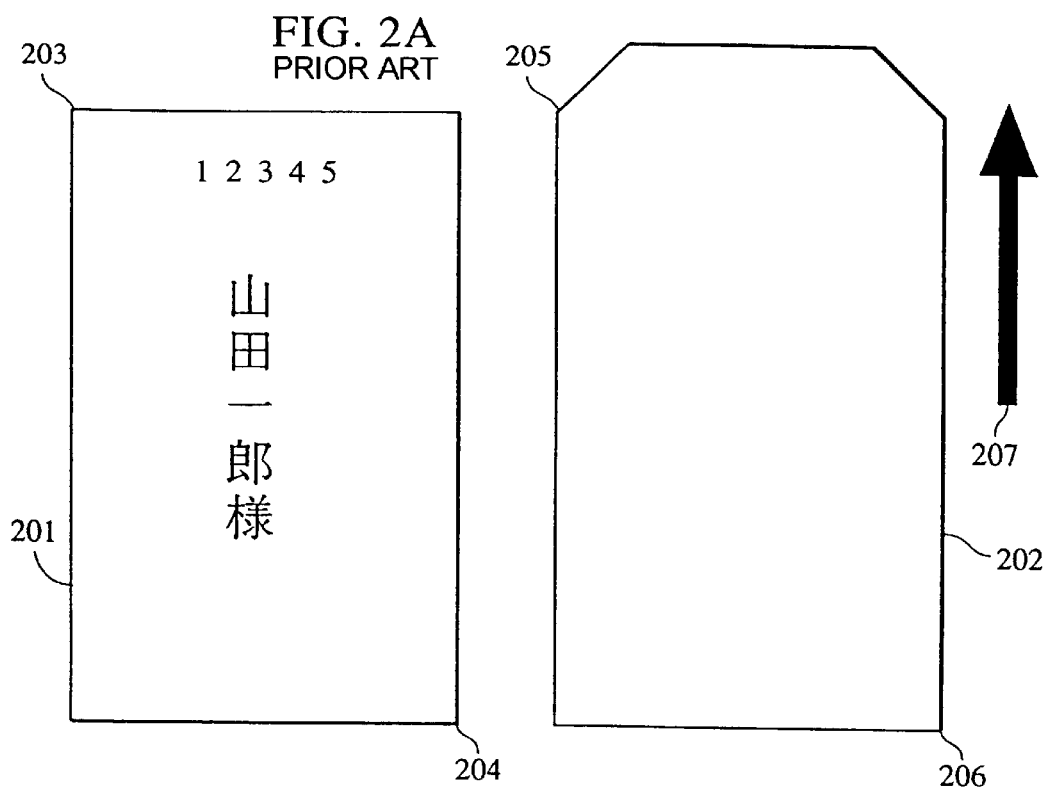
FIG. 2A illustrates the relationship between the normal feeding direction of an envelope and the orientation of an image to be printed.
Figure 2B:
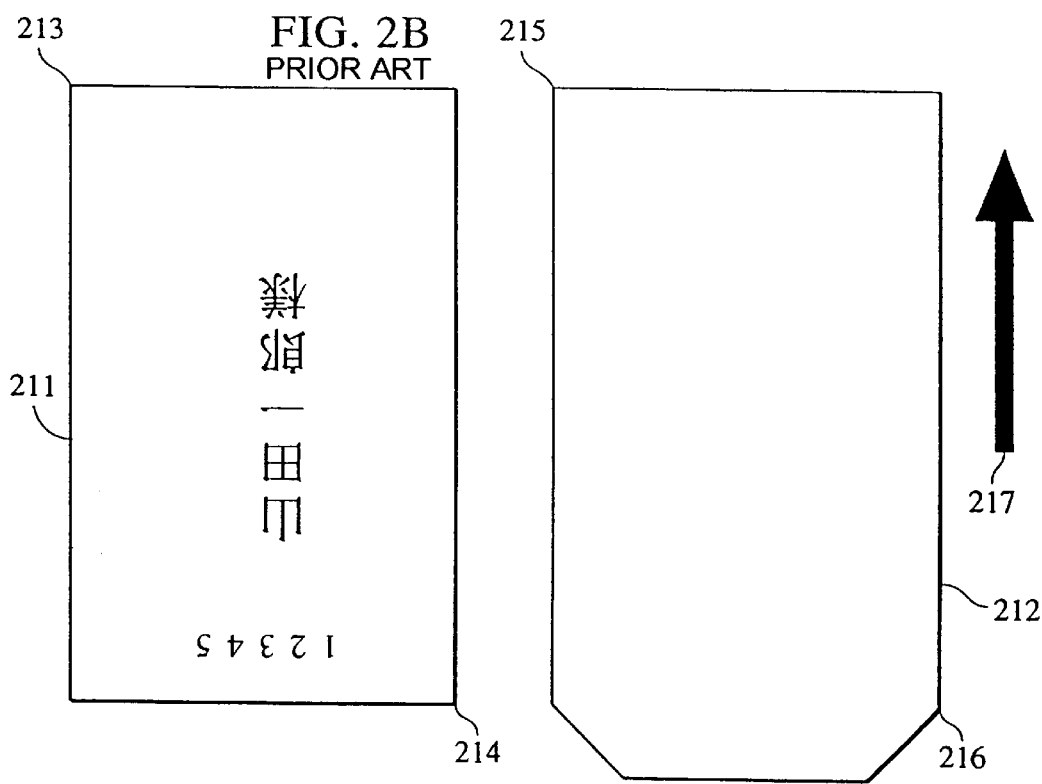
FIG. 2B illustrates the relationship between the reverse feeding direction of an envelope and the orientation of an image to be printed.

A description is now given below of preferred embodiments of the present invention with reference to the drawings.

FIRST EMBODIMENT

A first embodiment of the present invention is first discussed with reference to FIGS. 3 through 6.

FIG. 3 illustrates the minimal configuration of a printing system formed of a printing apparatus and an information processing apparatus according to the first embodiment of the present invention. The printing system includes an information processing apparatus 301, such as a computer, and a printing apparatus 302, which is an LBP in this embodiment. The printing apparatus 302 performs a printing operation on printing media, such as not only standard paper, but also envelopes and postcards. A communication channel 303 connects the information processing apparatus 301 and the printing apparatus 302, and print data and status information are transmitted between the two apparatuses through the channel 303. The information processing apparatus 301 transmits print data to the printing apparatus 302 through the communication channel 303 and causes the printing apparatus 302 to print the data on paper. Although the minimal configuration of the printing system is shown in FIG. 3, a plurality of one of the apparatus or a plurality of both apparatus may be provided.

In the printing system constructed as described above, a determination is made of whether the paper type designated for use in printing requires specific printing processing, such as reverse feeding and printing and/or cardboard mode fixing. The determination is made in accordance with the attributes of the type of paper, and upon determination, the print engine (not shown) is controlled so as to perform reverse feeding and printing and/or cardboard mode fixing. The above-mentioned determining and controlling operation may be performed by either the information processing apparatus 301 or the printing apparatus 302. In this embodiment, it is assumed that the printing apparatus 302 performs such an operation.

FIG. 4 is a block diagram illustrating an example of the configuration of the printing apparatus 302.

The illustrated printing apparatus 302 is formed of the following elements. A controller 402 controls the operation of the entire printing apparatus 302 and is formed of a microprocessor system, including such elements as a read only memory (ROM), a random access memory (RAM), and a central processing unit (CPU). An interface 403 receives print data to be input into the printing apparatus 302 and transmits status data to an external source outside the printing apparatus 302. A graphics unit 404 executes graphic processing. A graphics memory 405 stores graphics information output from the graphics unit 404. An engine interface 406 video-transfers the content of the graphics memory 405 to a print engine 407. Based on the data transferred from the graphics memory 405, the print engine 407 prints a visual image on paper. A paper controller 408 controls the feeding of paper to the print engine 407 based on control information supplied from the controller 402. An engine controller 409 controls the operating parameters of the print engine 407 based on control information supplied from the controller 402.

The controller 402, the interface 403, the graphics unit 404, the graphics memory 405, the engine interface 406, the paper controller 408, and the engine controller 409 are connected via a bus 410.

With the above configuration, the controller 402 determines whether the paper type designated for use in printing requires the aforementioned reverse feeding and printing and/or cardboard mode fixing. In accordance with the determination, the controller 402 controls the entire printing apparatus 302 to perform the corresponding operation if necessary.

The detailed operation of the system is discussed below with reference to the flow chart of FIG. 5. The process shown in FIG. 5 is executed by, in this example, the CPU of the controller 402 running a program stored in the ROM.

Figure 5:
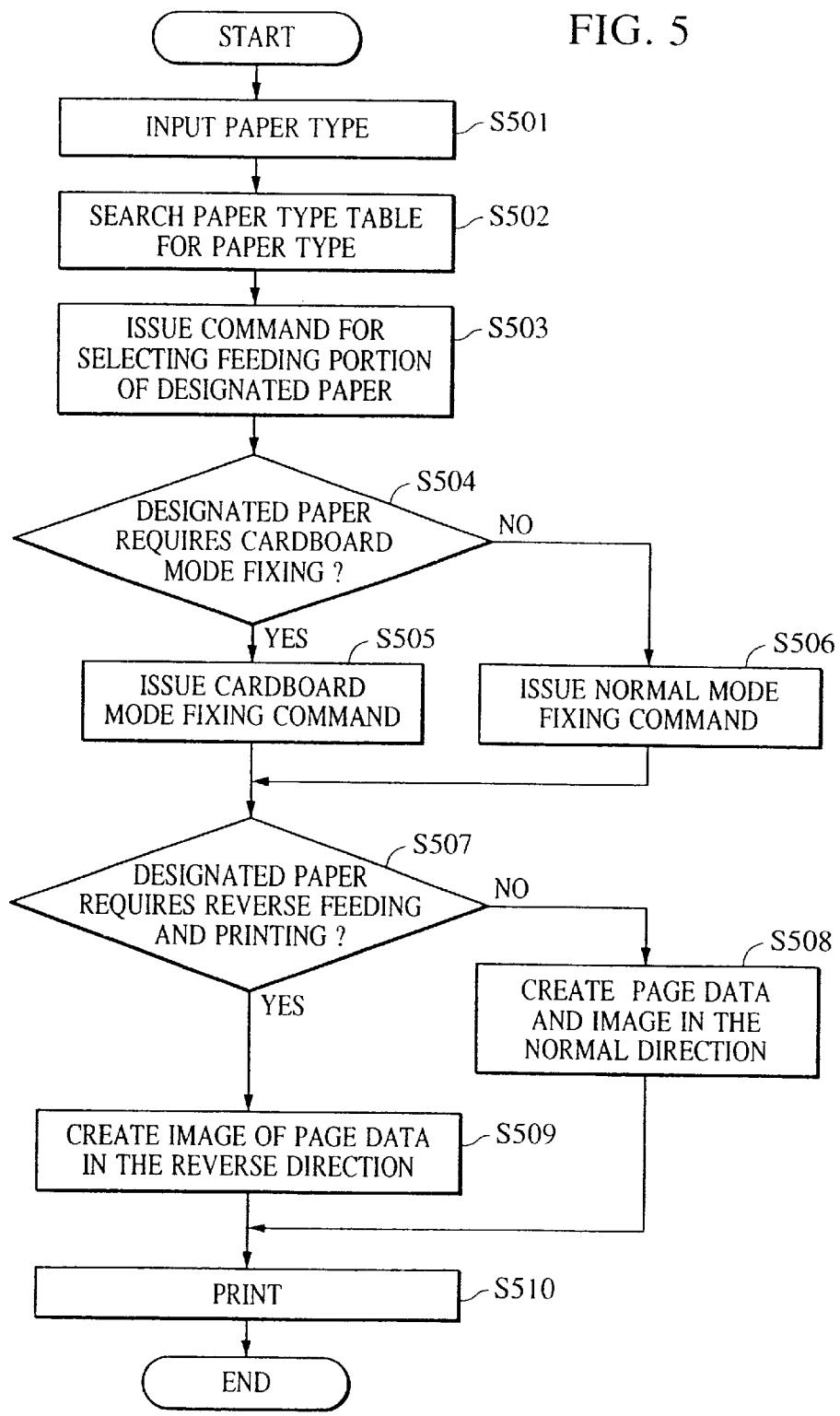
FIG. 5 is a flow chart illustrating the process steps to of performing a specific printing operation by a printing apparatus according to a first embodiment of the present invention.

Referring to FIG. 5, in step S501, the paper type is first input. The paper type information is transmitted from the information processing apparatus 301 of the printing system shown in FIG. 3 to the printing apparatus 302 via the communication channel 303 and is received by the interface 403.

Upon designation of the paper type, in step S502, the controller 402 searches a paper type table stored in the ROM of the controller 402 for data concerning the designated paper type.

The paper type table is now discussed below with reference to FIG. 6. FIG. 6 illustrates an example of the logical structure of a paper type table 601. The paper type table 601 is organized in three columns, with paper type data in a paper type column 602, normal feeding data or reverse feeding data in a feeding direction column 603, and normal mode fixing data or cardboard mode fixing data in a fixing mode column 604. Each row of data forms one record, which includes a corresponding item from each column. In this manner, a plurality of records 611 through 616 are stored in the table 601. For example, the first record 611 shows that the paper type is A4, which is printed by normal feeding and normal mode fixing. The fifth record 615 indicates that the paper type is "Envelope Kakugata No. 2", which is printed by reverse feeding and cardboard mode fixing.

Of course, table 601, shown in FIG. 6, is merely exemplary, including six paper types and two variable operation parameters. The table can be expanded as desired to accommodate more paper types or parameters. Similarly, the parameters themselves can be augmented to include more than two options per parameter. For example, in addition to normal feeding and reverse feeding, the feeding direction column can also include entries for sideward feeding, in which the paper and image are rotated ninety degrees from normal feeding. It will be apparent that the description of the operation, which for illustrative purposes is based on the exemplary table 601 shown in FIG. 6, can be expanded accordingly to accommodate such additional paper types, parameters, or options.

Referring back to FIG. 5, in step S503, the controller 402 issues a command for selecting a feeding portion of the specified paper to the paper controller 408 and performs the setting for the feeding operation in the print engine 407.

Subsequently, in step S504, the controller 402 reads data stored in the fixing mode column 604 of the paper type table 601 corresponding to the designated paper type and then determines from the read data whether the specified paper requires the cardboard mode fixing operation.

If the answer of step S504 is yes, the process proceeds to step S505 in which the controller 402 issues a cardboard mode fixing command, and the engine controller 409 sets the print engine 407 for the cardboard mode fixing operation. In the cardboard mode fixing operation, the amount of heat applied to the paper is increased by decreasing the feeding rate of paper passing through the print engine 407 or increasing a voltage applied to a heating unit for the fixing operation.

Conversely, if it is found in step S504 that the designated paper does not require cardboard mode fixing, the process proceeds to step S506 in which the controller 402 issues a normal mode fixing command, and the engine controller 409 sets the print engine 407 for normal mode fixing.

Thereafter, in step S507, the controller 402 reads data stored in the feeding direction column 603 of the paper type table 601 corresponding to the paper type found in step S502 and then determines from the read data whether the specified paper type requires the reverse feeding and printing operation.

If the query asked in step S507 is answered yes, the process proceeds to step S509 in which the controller 402 controls the graphics unit 404 to create an image corresponding to the reverse feeding, i.e., an image formed in a direction reverse to the feeding direction. On the other hand, if it is found in step S507 that the designated paper does not require the reverse feeding and printing operation, the process proceeds to step S508 in which the controller 402 controls the graphics unit 404 to create a normal image formed in the same direction as the feeding direction. The image information is then stored in the graphics memory 405.

In step S510, the controller 402 then transfers the information stored in the graphics memory 405 to the print engine 407 via the engine interface 406 and causes the print engine 407 to perform printing. The feeding direction and the fixing mode employed in the printing operation conform to the results determined in step S507 and step S504, respectively.

According to the first embodiment, in the printing apparatus 302, a determination is first made of whether the designated paper requires the reverse feeding and printing operation and/or cardboard mode fixing, thereby making it possible to automatically perform the corresponding operation if necessary. This enables the user to simply specify the paper type, for example, an envelope, without needing to designate the reverse feeding and printing operation or cardboard mode fixing, which could otherwise cause erroneous operations in specifying the above operation or mode and could further cause a waste of paper due to incorrect printing.

In the first embodiment, the controller 402 of the printing apparatus 302 is used for determining whether the designated paper type needs the reverse feeding and printing operation and/or cardboard mode fixing, and for controlling the printing apparatus 302 to perform the corresponding operation if necessary. However, the controller of the information processing apparatus 301 of the printing system illustrated in FIG. 3 may be employed for the aforementioned determining and controlling operations.

Although in the foregoing embodiment the reverse feeding and printing operation and cardboard mode fixing have been described, additional or different types of specific operations may be incorporated as noted in the technical concept of the present invention.

Second Embodiment

A second embodiment of the present invention is now described with reference to FIGS. 7 through 10. The second embodiment, like the first embodiment, utilizes the information processing apparatus 301 and the printing apparatus 302 of the printing system shown in FIG. 3.

The configuration of hardware of the printing apparatus 302 of the second embodiment is the same as that illustrated in FIG. 4. It will again be assumed that the controller 402 of the printing apparatus 302 determines whether the type of paper designated for use in printing requires the reverse feeding and printing operation and/or cardboard mode fixing, and controls the printing apparatus 302 to perform the corresponding operation if necessary. Unlike the first embodiment, however, if the controller 402 determines that the designated type of paper requires the reverse feeding and printing operation, it reports to the information processing apparatus 301 that the reverse feeding and printing operation is to be performed.

Figure 7:
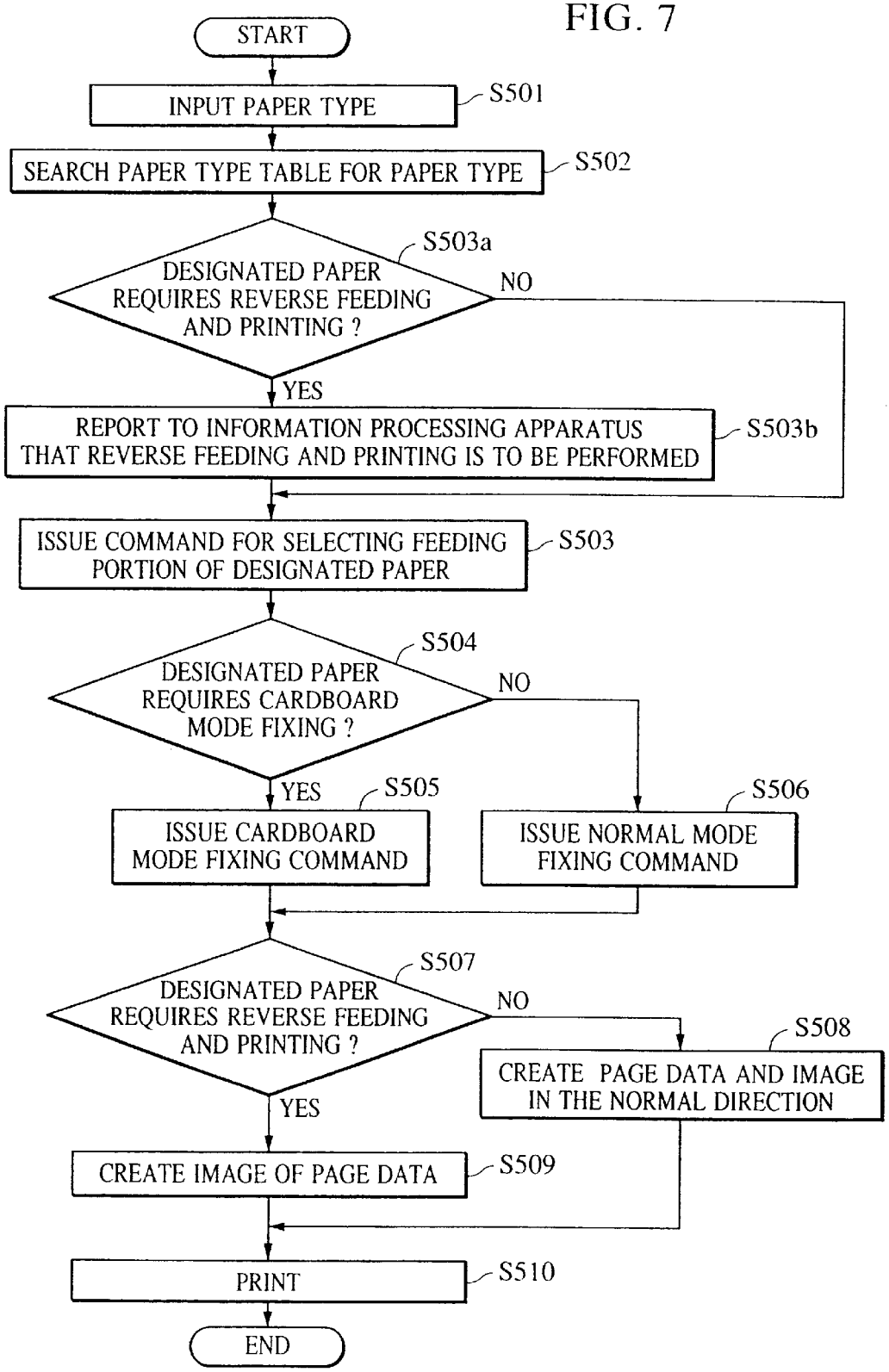
FIG. 7 is a flow chart illustrating the process steps of performing a specific printing operation by a printing apparatus according to a second embodiment of the present invention.

FIG. 7 indicates the control operation performed by the controller 402 of the printing apparatus 302. In the flow chart of FIG. 7, steps S503a and S503b are inserted immediately after step S502 of the flow chart of FIG. 5 illustrating the first embodiment, and steps S503 and the subsequent steps are similar to those of the flow chart of FIG. 5.

Referring to the flow chart of FIG. 7, in step S501, the type of paper is first input. In step S502, the controller 402 then searches the paper type table 601 for the input paper type. A determination is then made in step S503a of whether the specified paper type requires the reverse feeding and printing operation. If the answer of step S503a is yes, the process proceeds to step S503b in which the controller 402 reports to the information processing apparatus 301 that the reverse feeding and printing operation is to be performed. The steps other than steps S503a and S503b are similar to those of the first embodiment, and an explanation thereof is thus omitted.

Figure 8:
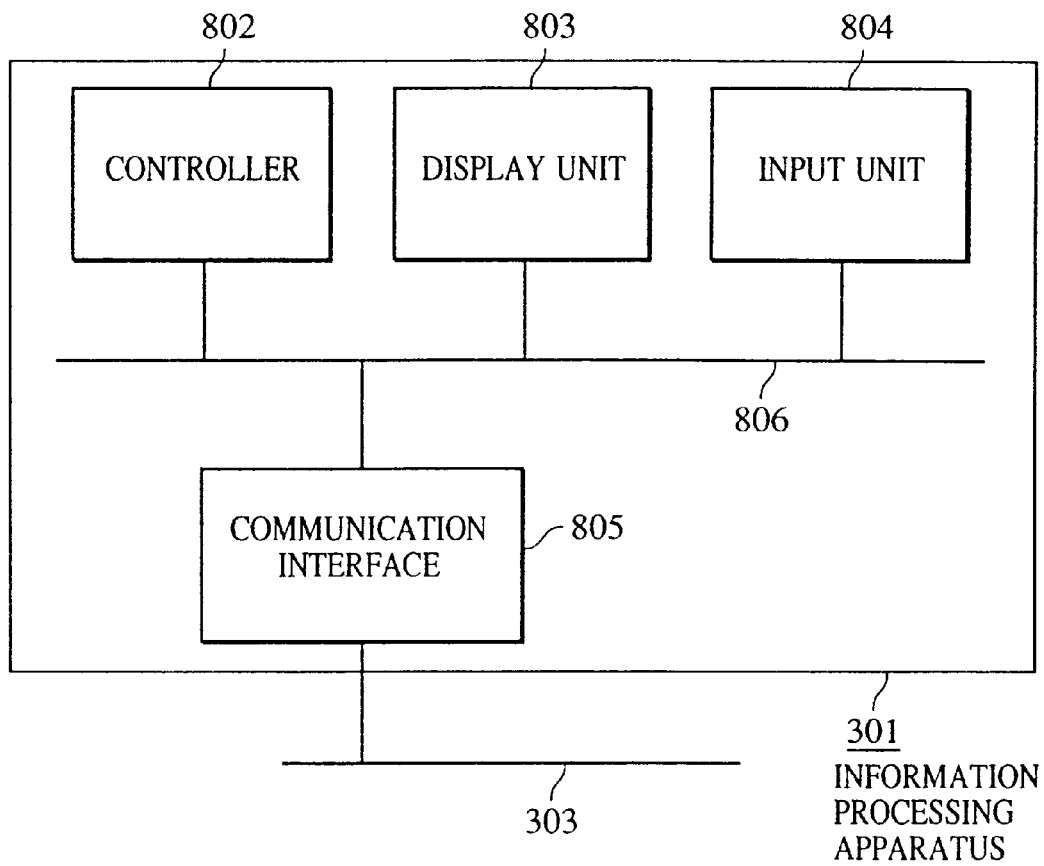
FIG. 8 is a block diagram illustrating the configuration of an information processing apparatus according to the second embodiment of the present invention.

Upon receiving the information from the printing apparatus 302 in step S503b, the information processing apparatus 301 indicates to the user that the reverse feeding and printing operation is to be performed. FIG. 8 is a block diagram illustrating an example of the configuration of the information processing apparatus 301 of this embodiment.

Referring to FIG. 8, the information processing apparatus 301 includes the following elements. A controller 802, which controls the operation of the entire information processing apparatus 301, is formed of a microprocessor system including such elements as a CPU, a ROM, a RAM and secondary storage units, such as a disk drive.

A display unit 803, which displays the information for the user of the information processing apparatus 301, is formed of a display device, such as a cathode-ray tube (CRT) or a liquid crystal display, a memory for storing a bit map image to be displayed, and a display interface for controlling the display device.

An input unit 804, through which the user of the information processing apparatus 301 inputs information, is formed of a keyboard, a mouse, etc.

A communication interface 805 receives via a communication channel 303 status information, such as the information input from the printing apparatus 302 to the information processing apparatus 301 indicating that the reverse feeding and printing operation is to be performed. The communication interface 805 also transmits print data to the printing apparatus 302.

Figure 9:
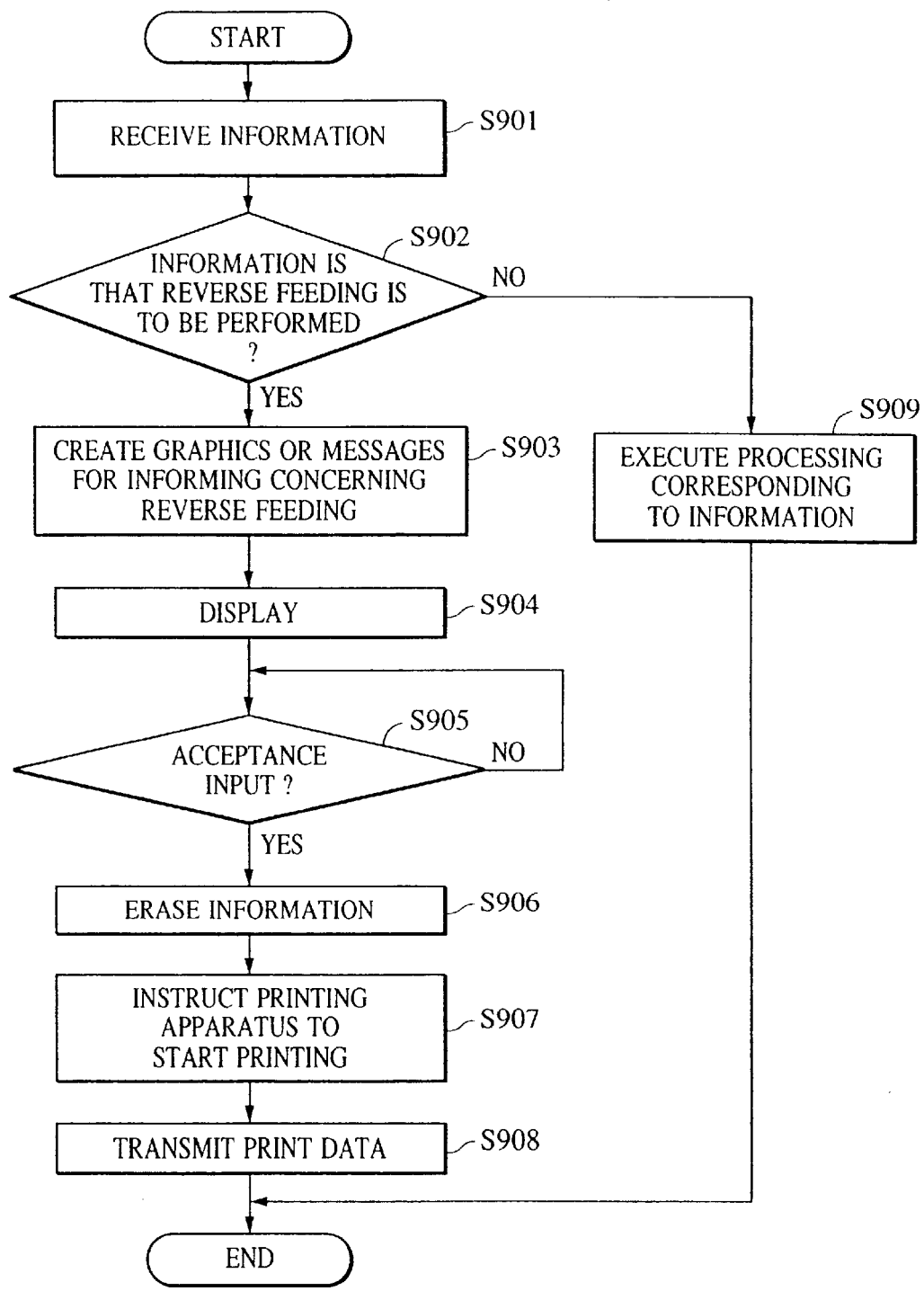
FIG. 9 is a flow chart illustrating the process steps of displaying the information concerning a reverse feeding and printing operation by the information processing apparatus shown in FIG. 8.

The flow chart of FIG. 9 illustrates the control operation of the controller 802 upon receiving from the printing apparatus 302 the information that the reverse feeding and printing operation is to be performed. The process indicated in the flow chart of FIG. 9 is executed by the CPU of the controller 802 running a program stored read into the RAM from a hard disk.

Referring to FIG. 9, in step S901, the communication interface 805 of the information processing apparatus 301 receives reporting information from the printing apparatus 302. The controller 802 then determines in step S902 whether the reporting information indicates that the reverse feeding and printing operation is to be performed. If the answer of step S902 is yes, the process proceeds to step S903. In step S903, according to the predetermined procedure, a message or graphics image is created or retrieved from memory for display on the display unit 803 to inform the user that the reverse feeding and printing operation is to be performed. The message or graphics can be, for example, one of the following:

Message explaining that the printing apparatus 302 is to perform the reverse feeding and printing operation, such as "Designated Envelope Kakugata No. 2 is printed in the opposite direction".

Message explaining a method for setting paper in the printing apparatus 302, such as "Designated Envelope Kakugata No. 2 is printed in the opposite direction. Open the feeding tray and set the envelope such that the unsealed end is placed away from the printer and the sealed end is placed toward the printer".

Graphics illustrating that the printing apparatus 302 is to perform the reverse feeding and printing operation.

Graphics illustrating a method for setting paper in the printing apparatus 302.

Subsequently, in step S904, the controller 802 controls the display unit 803 to display the message or graphics created in step S903. It is then determined in step S905 whether the user of the information processing apparatus 301 has accepted the displayed message or graphics. Once the query asked in step S905 is answered yes, the process proceeds to step S906 in which the displayed information is erased.

Thereafter, in step S907, the controller 802 transmits information to the printing apparatus 302 via the communication interface 805 and the communication channel 303 to instruct the printing apparatus 302 to start a printing operation. In step S908, the controller 802 then transmits print data to cause the printing apparatus 302 to start printing.

Conversely, if the outcome of step S902 is that the reporting information received in step S901 does not indicate that the reverse feeding and printing operation is to be performed, the controller executes in step S909 processing corresponding to the information.

In step S905, the controller 802 waits for the input of acceptance of the user. However, step S905 may be omitted, and the display unit 803 may display a message or graphics in step S904 for only a predetermined period.

Figure 10:
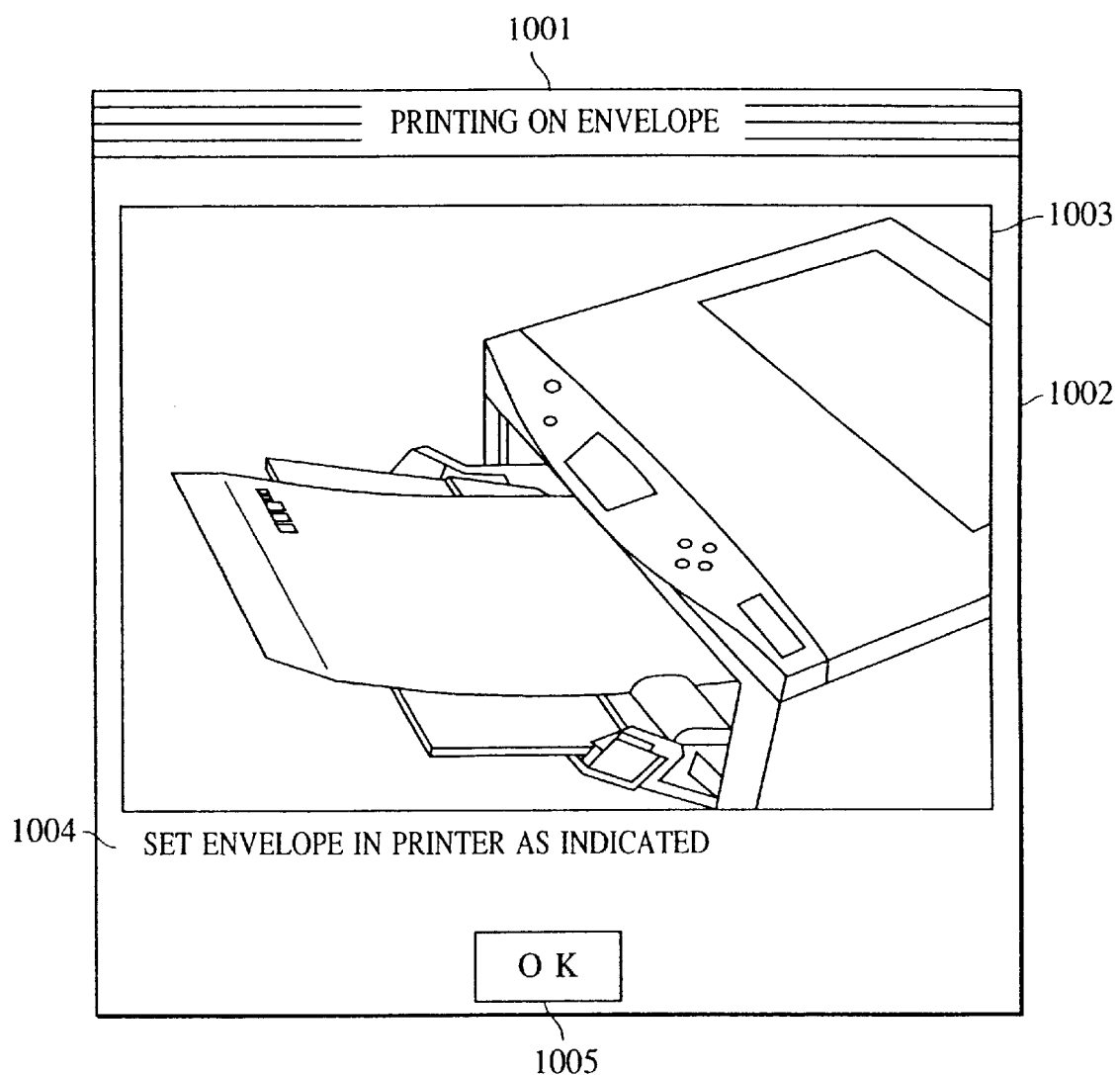
FIG. 10 illustrates a display example of messages and graphics concerning the reverse feeding and printing operation.

FIG. 10 shows an example of messages that the display unit 803 can display in step S904. In this example, messages are displayed on the display unit of an information processing apparatus, such as a computer, on which an operating system provided with a multi-window function runs. FIG. 10 shows a title of the window 1001, which indicates "Printing on envelope" in this example, a window frame 1002 and an image region 1003 representing that an envelope is set in the printing apparatus. Reference numeral 1004 indicates a message region in which a message urges the user to set the envelope in the printing apparatus as indicated by the image shown in the image region 1003. Reference numeral 1005 indicates a button through which the user is able to input his/her acceptance of the reporting information in step S905 of FIG. 9.

According to the second embodiment, when the controller 402 of the printing apparatus 302 determines that the designated paper type for use in printing requires the reverse feeding and printing operation, it reports to the information processing apparatus 301 that the reverse feeding and printing operation is to be performed. Upon receiving the information, before the operation is actually performed, the controller 802 of the information processing apparatus 301 displays on the display unit 803 the information concerning the reverse feeding and printing operation, such as the orientation of an envelope to be set in the printing apparatus 302. The user is thus able to recognize that the reverse feeding and printing operation is to be performed and make any required arrangements for the operation, such as correctly setting the orientation of the envelope. This helps to reduce misfeeds which would otherwise cause paper jams and prevent proper execution of the reverse feeding and printing operation.

In the foregoing embodiment, the information concerning the reverse feeding and printing operation reported to the user is displayed on the information processing apparatus 301. However, a comparatively large display unit may be provided for the printing apparatus 302, and the controller 402 of the printing apparatus 302 may display the above information without reporting it to the information processing apparatus 301 in step S503b of FIG. 7.

The information to be displayed is not limited to the reverse feeding and printing operation. If other types of specific printing operations are performed, corresponding information may be displayed before the operations are actually performed.

Although an LBP is used as the printing apparatus in the foregoing embodiments, other types of apparatus, such as an ink-jet printer, may be used. No matter which printing apparatus is used, the following technical concept of the present invention may be applied. A determination is first made of whether a specific printing operation is to be performed in accordance with the type of paper (recording medium), and if necessary, the corresponding operation is automatically performed. The information concerning the specific printing operation can be displayed before the actual operation is started.

As noted, the type of recording medium is not limited to standard printing paper, envelopes or postcards shown in FIG. 6, and other types of paper or other types of materials may be used.

In the foregoing embodiments, the control operations shown in FIGS. 5 and 7 are performed by the printing apparatus 302. If, however, the information processing apparatus 301 performs the operations instead of the printing apparatus 302, the following modifications may be made. In step S501, the user may designate the type of paper through, for example, a keyboard. In steps S503, S505, and S506, commands corresponding to the print data may be issued. In steps S508 and S509, rather than an image of page data, print data specifying an image to be printed may be generated. In step S510, the created print data may be transmitted to the printing apparatus 302. In the above case, steps S903 through S906 of FIG. 9 may be preferably be performed between steps S507 and S509 of FIG. 5 or instead of step S503b of FIG. 7.

In the foregoing embodiments, an inverted image is created in a memory in order to perform the reverse feeding and printing operation. However, regardless of whether it is performed by the reverse feeding and printing operation, a non-inverted image may be created in the memory and then inverted by reversing the order of addresses or by reversing the content of data obtained upon reading the addresses.

In the foregoing embodiments, when a predetermined type of envelope is specified, both the reverse feeding and printing operation and cardboard mode fixing are performed. It is not, however, always necessary to perform both operations, and one or the other of them may suffice, and a specific printing operation different from the above operations may be performed.

For example, as noted above, when an envelope having an unsealed portion in the longitudinal direction is specified, an image may be turned at 90 degrees (or the landscape mode may be set). In this case, graphics or messages indicated in FIG. 9 or 10 should be displayed on a display unit so that the user is able to recognize which side of the unsealed portion of the envelope is to be placed in the tray, and the image should be accordingly turned at 90 degrees to match the feeding direction of the envelope displayed on the display unit.

To those skilled in the art, it will be apparent how to provide program code implementing the aforementioned process executed in the printing apparatus or the information processing apparatus. Such a program code may be stored in a storage media such as a floppy disk or a CD-ROM.

As is seen from the foregoing description, according to the present invention, several advantages are offered by a printing apparatus in which a plurality of types of recording media are usable or by an information processing apparatus that transmits print data to the printing apparatus to effect a printing operation. A determination is made of whether the designated recording medium for use in printing requires a predetermined specific printing operation, and if necessary, the corresponding operation is performed. Thus, the user merely designates the type of recording medium, and the apparatus automatically executes the specific printing operation in accordance with the designated type of recording medium. This significantly simplifies the user's input for such a specific operation and enhances the usefulness of the apparatus. Further, the erroneous operations caused by a user designating an incorrect printing operation are eliminated, thereby reducing the waste of recording media, such as paper, caused by incorrect printing.

In the aforementioned printing apparatus or the information processing apparatus, information concerning a specific printing operation can be displayed before the printing operation is actually performed. The user is thus able to recognize that the specific printing operation is to be performed and make suitable arrangements for the operation, thereby enhancing usefulness of the apparatus. In particular, the apparatus can prompt the user as to orientation in which the recording medium is to be set, thereby reducing the occurrence of jams due to the erroneous setting of the recording medium. By virtue of this information, the apparatus exhibits excellent advantages, such as reducing breakdowns of the print mechanism or prolonging the life of the print mechanism.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest reasonable interpretation so as to encompass all such modifications and equivalent structures and functions.

What is claimed is:

1. A printing apparatus with which a plurality of types of recording media are usable, said printing apparatus comprising:

a printing mechanism for performing one or more of a plurality of printing operations;

input means for receiving a signal designating one of the plurality of types of recording media is to be used;

determining means for determining a first printing operation and a second printing operation, both of which are required to print on the designated recording medium;

control means for controlling said printing mechanism to perform the first printing operation and the second printing operation based on said determining means determining that the designated recording medium requires both the first printing operation and the second printing operation; and display means, wherein said control means causes said display means to display information concerning the first printing operation before said printing mechanism performs the first printing operation and wherein the first printing operation is a reverse feeding printing operation.

2. An information processing apparatus that transmits print data to a printing apparatus, with which a plurality of types of recording media are usable and which performs one or more of a plurality of printing operations, to cause the printing apparatus to perform one or more of the plurality of printing operations, said information processing apparatus comprising:

input means for receiving a signal designating one of the plurality of types of recording media is to be used;

determining means for determining a first printing operation and a second printing operation, both of which are required to print on the designated recording medium;

control means for controlling the printing apparatus to cause the printing apparatus to perform the first printing operation and the second printing operation based on said determining means determining that the designated recording medium requires both the first printing operation and the second printing operation; and display means, wherein said control means causes said display means to display information concerning the first printing operation before the printing apparatus performs the first printing operation and wherein the first printing operation is a reverse feeding printing operation.

3. A printing method for use in a printing apparatus, with which a plurality of types of recording media are usable and which includes a printing mechanism for performing one or more of a plurality of printing operations, said method comprising the steps of:

receiving a signal designating one of the plurality of types of recording media is to be used;

determining a first printing operation and a second printing operation, both of which are required to print on the designated recording medium;

controlling the printing mechanism of the printing apparatus to cause the printing mechanism to perform the first printing operation and the second printing operation based on it being determined in said determining step that the designated recording medium requires both the first printing operation and the second printing operation; and displaying information concerning the first printing operation before the printing mechanism performs the first printing operation and wherein the first printing operation is a reverse feeding printing operation.

4. A storage medium that stores a program code implementing a method for transmitting print data to a printing apparatus, with which a plurality of types of recording media are usable and which performs one or more of a plurality of printing operations, to cause the printing apparatus to perform one or more of the plurality of printing operations, said method comprising the steps of:

receiving a signal designating one of the plurality of types of recording media is to be used;

determining a first printing operation and a second printing operation, both of which are required to print on the designated recording medium;

controlling the printing apparatus to cause the printing apparatus to perform the first printing operation and the second printing operation based on it being determined in said determining step that the designated recording medium requires both the first printing operation and the second printing operation; and displaying information concerning the first printing operation before the printing apparatus performs the first printing operation and wherein the first printing operation is a reverse feeding printing operation.

* * * * *